United States Patent
McCray et al.

(10) Patent No.: US 6,793,820 B1
(45) Date of Patent: Sep. 21, 2004

(54) ETHYLENE-VINYL ALCOHOL HOLLOW FIBER MEMBRANES

(75) Inventors: Scott B. McCray, Bend, OR (US); Dwayne T. Friesen, Bend, OR (US); Delores R. Sidwell, Bend, OR (US); David K. Lyon, Bend, OR (US); Daichi Sakashita, Fujisawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/889,553

(22) PCT Filed: Dec. 20, 1999

(86) PCT No.: PCT/JP99/07144

§ 371 (c)(1), (2), (4) Date: Jul. 19, 2001

(87) PCT Pub. No.: WO00/43115

PCT Pub. Date: Jul. 27, 2000

Related U.S. Application Data

(63) Continuation-in-part of application No. 09/234,755, filed on Jan. 21, 1999, now abandoned.

(51) Int. Cl.[7] .............................................. B01D 29/00
(52) U.S. Cl. ........................... 210/500.23; 210/500.27; 210/500.42; 264/41; 264/185; 264/263; 264/585

(58) Field of Search .................. 210/500.23, 500.27, 210/500.42, 500.41, 500.36; 264/41, 185, 263, 561; 428/358, 354; 521/141

(56) References Cited

U.S. PATENT DOCUMENTS

| 3,907,675 A |   | 9/1975  | Chapurlat et al. |
|-------------|---|---------|------------------|
| 4,362,677 A | * | 12/1982 | Yamashita et al. |
| 5,547,756 A | * | 8/1996  | Kamo et al.      |
| 5,962,544 A | * | 10/1999 | Waller, Jr.      |

FOREIGN PATENT DOCUMENTS

| EP | 0 747 113 | 12/1996 |
|----|-----------|---------|
| FR | 2 314 215 | 1/1977  |
| JP | 6116132   | 8/1980  |

OTHER PUBLICATIONS

Patent Abstracts of Japan, vol. 004, No. 182 (C–035), Dec. 16, 1980, abstract of JP 55–122010.

* cited by examiner

*Primary Examiner*—Ana M. Fortuna
(74) *Attorney, Agent, or Firm*—Wenderoth, Lind & Ponack, LLP

(57) ABSTRACT

EVAL microporous hydrophilic hollow fiber membranes are formed from a casting dope that includes low and high molecular weight pore-formers. Post-fabrication treatment includes stretching, hot water soaking and crosslinking.

22 Claims, No Drawings

ETHYLENE-VINYL ALCOHOL HOLLOW FIBER MEMBRANES

This is a 371 of PCT/JP99/07144, filed Dec. 20, 1999, which is a continuation-in-part of Ser. No. 09/234,755, filed Jan. 21, 1999, now abandoned.

BACKGROUND ART

Hollow fiber membranes have gained acceptance for use in treating many aqueous streams. In some cases, use of hollow fiber membranes is essential for the supply of clean drinking water and for treatment of wastewater. Hollow fiber membranes can also be used to de-water sludges and other streams containing suspended solids. Key to the successful use of such membranes for these purposes is that the membrane be hydrophilic, allowing the membrane to "wet" when in contact with the stream to be treated. For this to occur, the membrane should advantageously be made from a hydrophilic polymer.

One such polymer that has proved suitable for making hydrophilic hollow-fiber membranes is an ethylene-vinyl alcohol (EVAL) copolymer. Such a copolymer is known to be useful in blood dialysis and, because of its hydrophilicity and excellent rejection of high molecular weight substances such as proteins, has many other uses in medical and laboratory applications. Typically, EVAL hollow fiber membranes are cast by forcing a solution of EVAL copolymer through an orifice along with a lumen-forming solution and into a coagulation bath to form membranes having different morphologies and pore structures, depending upon the composition of the casting dope and the process conditions. See, for example. U.S. Pat. Nos. 4,134.837, 4,269,713, 4,317,729 4,362,677, 4,385,094, and Japanese Published Application No. 57-18924. Although a variety of these patents report the use of either a low molecular weight pore-former or a high molecular weight pore-former, there is no recognition of the value of a mixture of both low and high molecular weight pore-formers, and the EVAL membranes prepared according to the processes reported still suffer from a relatively low water flux and limited structural integrity and lifetime when used in applications requiring higher fluid pressures.

DISCLOSURE OF INVENTION

According to the present invention there is provided a process for the fabrication of a strong, durable microporous hydrophilic hollow fiber membrane having high water flux. The process comprises casting the membrane by conventional spinneret technology from a casting dope comprising an EVAL copolymer having a particular composition, followed by a series of post-casting steps.

The casting dope comprises EVAL copolymer in a solvent; a small amount of water; and two pore-formers, one low molecular weight and one high molecular weight. The lumen-forming fluid and the coagulation bath are of conventional composition. After precipitation or coagulation, the hollow fiber membranes are preferably stretched, soaked in hot water, and crosslinked.

BEST MODE FOR CARRYING OUT THE INVENTION

An ideal microporous hydrophilic hollow fiber membrane has three essential characteristics. First, the fiber should have a high water flux. Generally, water fluxes greater than about 2 m$^3$/m$^2$·d·0.1 MPa at 25° C. will lead to commercially practical processes. Second, the fiber should have a high wet tensile strength. This will ensure that the fiber has a long lifetime when operating under high pressure differentials, or when the fiber is under stress during operation. Generally, the wet tensile strength of the fiber should be on the order of at least about 180 g/fil. Third, the fiber should have a high wet elongation at break so as to ensure long fiber lifetimes and durability under operating conditions. Generally, the wet elongation at break should be greater than about 40%.

A microporous hydrophilic hollow fiber membrane with such characteristics will be useful for a wide range of applications, including water purification, wastewater treatment and dewatering sludges. The present invention describes a process for the fabrication of such a membrane.

The first step in preparing a microporous hydrophilic hollow fiber membrane according to the present invention is to prepare a spinning solution, comprising a mixture of an EVAL copolymer, a low molecular weight pore-former, a high molecular weight pore-former, water, and a solvent.

Although virtually any EVAL copolymer may be used in the present invention, copolymers with an ethylene content (relative to vinyl alcohol content) of 27 mol % to 48 mol % are especially suitable.

In making a high-performance membrane, the concentration of EVAL copolymer in the spinning solution should be greater than about 25 wt % based upon the total weight of the spinning solution. If the concentration of copolymer is less than this, the strength of the resulting fiber is too low. Conversely, if the concentration of copolymer is too high, the water flux through the fiber is too low. It has been found that the concentration of EVAL copolymer should be kept in the range of 25 to 40 wt % to obtain practical water fluxes.

The spinning solution preferably contains at least two pore-formers: one with a low molecular weight and one with a high molecular weight. The term "low molecular weight" means ≦1000 Daltons; and "high molecular weight" means ≧1000 Daltons. It has been found that this combination of pore-formers results in a structure suitable for a high-performance membrane. If only a low molecular weight pore-former is used, it has been found that the wall of the resulting fiber contains large voids. These voids reduce the strength of the fiber and are likely to result in defects or damage. In addition, use of only a low molecular weight pore-former leads to an outside surface with little or no porosity, which leads to low water fluxes. Conversely, if only a high molecular weight pore-former is used, it has been found that both the wall and the outside surface of the resulting fiber has low porosity, also leading to low water fluxes. Preferably, the weight ratio of the low molecular weight pore-former to the high molecular weight pore-former should be greater than about 0.3 but less than about 3. The spinning solution preferably contains the low molecular weight pore-former and the high molecular weight pore-former in an amount of 5 to 15 wt %, respectively, based on the total weight of the spinning solution.

Virtually any low molecular weight pore-former may be used, provided that the compound is not a solvent for the EVAL copolymer and provided it is miscible with the other components of the spinning solution and with the quench baths. Exemplary classes of suitable low molecular weight pore-formers include alcohols, ketones, amines, and esters. It has been found that the most effective low molecular weight pore-formers are mono- and polyhydric alcohols, such as n-propanol, isopropanol (IPA), n-butanol, ethylene glycol (EG), and glycerol.

The high molecular weight pore-former preferably is soluble in the solvent used to form the spinning solution and miscible in the spinning solution, resulting in solutions that are clear as opposed to cloudy. Exemplary suitable high molecular weight pore-formers include polyols such as polyethylene glycol (PEG), polypropylene glycol (PPG), and polyvinyl alcohol (PVA), polyvinyl pyrrolidone (PVP), and polyethylene oxide (PEO).

The spinning solution preferably also contains a small amount of water, in the order of 0.05 to 1 wt % based on the total weight of the spinning solution. The majority of this water is preferably introduced to the spinning solution by reason of the addition of the spinning solution's other components since such other components are very hydrophilic and tend to have non-zero concentrations of absorbed water. Since the concentration of water in these other components will depend on the methods used to dry them prior to formulating the spinning solution, it is desirable to add a small amount of water to maintain a total water concentration of between about 0.05 and 1 wt %.

Suitable spinning solution solvents include dimethyl sulfoxide (DMSO), dimethylacetamide (DMAC), dimethylformamide (DMF), and N-methyl pyrrolidone (NMP).

To form the solution, all components should first be thoroughly dried. Then, the components are mixed at elevated temperature, generally 80° C. to 100° C., for a suitable length of time, say, 16 to 48 hours. The resulting solution should be clear and have a viscosity ranging from about 30 to about 100 Pa.s (about 30,000 to about 100,000 cp) at 65° C. It should be noted that the components of these spinning solutions tend to precipitate when cooled, the temperature at which time the precipitation takes place being dependent upon the specific formulation of the spinning solution. Generally, precipitation takes place when the solutions are cooled below about 50° C. In some cases, the solution will cloud immediately prior to precipitation. It has been found that the solution can be cooled to the point of precipitation, then re-heated to greater than about 65° C. so as to re-form the spinning solution, with no adverse affects on the properties of fibers cast from the reconstituted solution. Preferably, however, the solution should be maintained at a temperature above the precipitation point (around >50° C.) while it is used, that is, while the solution is extruded to form a spun hollow fiber. In addition, the spinning solution should be filtered and degassed prior to casting hollow fiber membranes.

The membranes are cast by conventional spinneret technology, comprising extruding the spinning solution CD through the orifice of a needle-in-orifice spinneret. Simultaneously with the extrusion, a coagulating fluid is injected through the needle. Preferably, this coagulating fluid is an aqueous solution such as water alone or a mixture of water and a water-miscible organic fluid, generally characterized by the presence of at least 50 wt % water. Examples of suitable water-miscible organic fluids include low molecular weight alcohols, such as ethanol, IPA, n-propanol, EG and glycerol, and solvents used in the spinning solution, such as those mentioned above (DMSO, DMAC. NMP, and DMF).

From the spinneret, the extruded spinning solution and injected coagulating fluid are drawn into a quench bath consisting of 15 to 35 wt % alcohol in water. Exemplary alcohols include methanol, ethanol, IPA, n-propanol, butanol, EG, and propylene glycol. If the concentration of alcohol is less than about 15 wt %, the fiber quenches too rapidly, leading to a dense outside surface, and low water fluxes. On the other hand, if the concentration of alcohol is too high, the fiber does not quench rapidly enough. leading to flattened or damaged fibers.

Prior to drawing the extruded spinning solution and injected coagulating fluid into the quench bath, the same may be passed through an atmosphere. This atmosphere may consist of a gas, such as air or nitrogen, and may optionally contain a vapor, such as water vapor, solvent vapors, or other organic vapors. It has been found that passing the extruded spinning solution and injected coagulating fluid through an atmosphere of ambient air for 0.05 to 0.1 second produces suitable fibers.

Another important variable in forming the hollow fiber is the temperature of the quench bath. It has been found that the temperature should be maintained between about 40° C. and about 65° C. to form high-performance fibers. Generally, the higher the temperature of the quench bath, the larger is the resulting pore size on the outside surface of the membrane.

Once the microporous hollow fiber membrane has been formed, it should be rinsed to remove solvents and pore-formers, preferably with water. Generally, the water is maintained at a temperature of greater than about 40° C. to ensure proper removal of the residual solvents and pore-formers from the formed hollow fiber membrane. It has also been found that the performance of the fiber, and specifically, its water flux, can be increased by stretching the fiber during this rinsing step. Generally, the degree of stretching should be such that the ratio of the length of the fiber after stretching to the length of the fiber prior to stretching is between about 1.3 and about 3.0.

Once the fiber has been rinsed, it is dried prior to use. In some cases, it is desirable to first rinse the fiber in IPA, then in hexane prior to drying to retain high performance of the fibers.

The microporous hydrophilic hollow fiber membranes, of the present invention are also preferably crosslinked following fabrication. A particularly useful method for crosslinking the fibers involves the use of glutaraldehyde (GA), comprising (1) soaking the fiber in an aqueous GA solution, (2) drying the fiber, and (3) annealing the fiber. In this procedure, the GA solution should be aqueous, and should contain a small amount of an inorganic acid such as HCl as a catalyst. The concentration of GA used in this crosslinking solution should generally be greater than about 0.1 wt % but less than about 5 wt %. The fibers should be soaked in this solution for at least 1 minute, but less than 10 hours. The fiber should then be dried, usually at ambient temperature, to remove excess liquid solution. Drying times ranging from 1 minute to 4 hours have been found to be useful. The annealing step should be conducted at a temperature greater than about 50° C., but less than about 120° C. The annealing step should be conducted for more than about 5 seconds, but less than about 6 hours.

Another optional post-treatment which has been found to increase the fiber's water flux is soaking the fiber in hot water (hot water treatment) after the rinsing step. The present inventors has found that membrane performance of the hydrophilic microporous hollow fiber membrane such as flux and elongation at break may be significantly improved by subjecting the fiber to hot water treatment. The hot water treatment is conducted by soaking the prepared hydrophilic microporous hollow fiber membrane in a hot water bath at a temperature of 50° C. to 100° C. while relaxing tension on the fiber. Relaxation of tension on the fiber in the hot water bath may be carried out by feeding the fiber in a hot water bath using two motorized pulleys, one pulley being used as an inlet pulley by which the fiber membrane is introduced into the bath, and the other pulley being used as an outlet pulley by which the fiber membrane is pulled out from the bath, and maintaining the fiber placed in the bath in a "sagged" state between these two pulleys. It is important in this hot water treatment step for the fiber to be soaked in the hot water bath in fully sagged state, preferably under substantially no tension, such that the fiber may be freely floating in water as if "swimming" in water. If the hot water treatment is carried out while tension is applied to the fiber membrane, flux cannot be improved by this treatment.

The hot water treatment may be carried out for a term of 1 second to 1 hour. This treatment will result in better effect when the fiber is sufficiently swelled with water prior to the treatment. The hot water treatment may improve flux and elongation at break of the fiber membrane without affecting blocking ability or strength of the fiber membrane. The hot water treatment may be conducted just after the rinsing step as mentioned above. Or this hot water treatment may be conducted on a fiber membrane after the fiber membrane is rinsed and dried, and even after being preserved for a long period of time, to improve mechanical properties of the fiber membrane. However, in order to accomplish significant improvement of membrane performance, it is necessary to conduct the hot water treatment before the crosslinking step as mentioned above.

The thus heat treated hydrophilic microporous hollow fiber membrane may be taken up onto a drum. It is preferred that the fiber membrane is taken up onto a drum placed in warm water at a temperature of 30° C. to 70° C., and maintained therein for around one night. Thereafter, the fiber go membrane taken up onto the drum in water may be preserved in cold water at a temperature of 10–20° C. By conducting such a post-treatment step, improved membrane performance may be stabilized. When the crosslinking step is carried, out after the hot water treatment, the fiber membrane preserved in cold water may be directly fed to the crosslinking step.

EXAMPLE 1

A microporous hydrophilic hollow-fiber membrane according to the present invention was fabricated using the following steps.

1. Preparation of the Spinning Solution. A spinning solution was prepared by dissolving 30 wt % EVAL copolymer containing 44 mol % ethylene (EVAL Co. of America, Lisle, Ill.), 8.5 wt % PEG having a molecular weight of 3350 Daltons, 8.5 wt % EG, and 0.13 wt % water in DMSO by mixing said components at 80° C. for 16 hours. The resulting homogeneous solution had a viscosity of 50 Pa.s (50,000 cp) at 65° C. This solution was maintained at 65° C. prior to spinning.

2. Spinning the Hollow Fiber. The so-formed spinning solution was extruded through the orifice of a needle-in-orifice spinneret. A lumen-forming solution of water was injected simultaneously through the needle. The tip of the needle was maintained about 1 cm above the quench bath.

3. Quenching and Rinsing. The spun fiber was formed into a hollow fiber membrane by drawing it into a quench bath whereupon it precipitated. The bath comprised 25 wt % IPA in water maintained at 50° C. The residence time in the quench bath was approximately 20 seconds. The fiber was then rinsed for about 15 minutes in a godet filled with water at 50° C., then stretched by a factor of 2.4, i.e., the take-up speed was 2.4 times faster than the godet speed, then taken up onto a drum and further rinsed in hot water maintained at 40°–50° C. The fibers were then removed from the drum and rinsed overnight in hot water maintained at 45°–50° C.

4. Drying. The fibers were removed from the overnight rinse and soaked in 100% IPA for 10 minutes and then in 100% hexane for an additional 10 minutes prior to drying at ambient temperature in a dry air stream.

The dried hollow-fiber membranes were examined under a scanning electron microscope (SEM). The inside diameter of the fibers was found to be 330 $\mu$m, while the outside diameter was 875 $\mu$m. The wall structure was seen to be highly porous, while the outside surface also exhibited a high porosity—both characteristics of high-performance membranes.

Samples of these fibers were then incorporated into a small test module and the outside of the fibers was pressurized to 0.3 MPa at ambient temperature, with filtered, deionized water. The water flux through the fibers was found to be outstanding at 10 $m^3/m^2 \cdot d \cdot 0.1$ MPa at 25° C. (The same units were used for measuring the fluxes of all hollow fiber membranes prepared in the Examples.)

Samples of the fibers were also soaked in water at ambient temperature for 1 hour and then tested for tensile strength. The wet tensile strength was found to be close to ideal, at 180 g/fil, while the wet elongation at break was excellent at 73%.

EXAMPLE 2

Post-fabrication crosslinking was performed as follows. Samples of the fibers from Example 1 were soaked in an aqueous solution of 1 wt % GA and 0.4 wt % HCl for 4 hours at room temperature. The fibers were then dried at ambient temperature for 2 hours prior to placing them in an oven for annealing. The temperature of the oven was increased from ambient temperature to 80° C. at a rate of 1° C./min, held at 80° C. for 3 hours, and then cooled to ambient temperature over a period of 20 minutes. The properties of the resulting crosslinked fiber were measured following the procedures outlined in Example 1, and the results of the two presented in Table 1.

TABLE 1

| Example No. | Water Flux ($m^3/m^2 \cdot d \cdot 0.1$ MPa) | Wet Tensile Strength (g/fil) | Wet Elongation Break (%) |
|---|---|---|---|
| 1 | 10 | 180 | 73 |
| 2* | 7.5 | 420 | 25 |

* crosslinked

EXAMPLES 3–6

The effects of stretching during rinsing the membranes of the present invention were studied. Microporous hydrophilic hollow fibers were prepared as in Example 1, except that the polymer solution comprised 33 wt % EVAL, 7.5 wt % PEG, 7.5 wt % EG, and 0.13 wt % water in DMSO, and the quench bath consisted of 30 wt % IPA in water.

The degree of stretching ("stretch") during the rinse step was varied as shown in Table 2. These results'show that if the degree of stretching is low, water flux is low. In addition, too much stretching results in low water fluxes and low elongations at break. Based on these results, the optimum degree of stretching appears to be 2.4.

TABLE 2

| Example No. | Stretch | Water Flux (m³/m²·d·0.1 MPa) | Wet Tensile Strength (g/fil) | Wet Elongation at Break (%) |
|---|---|---|---|---|
| 3 | 1.0 | 0.0 | 140 | 230 |
| 4 | 1.8 | 4.5 | 120 | 90 |
| 5 | 2.4 | 10.0 | 130 | 51 |
| 6 | 3.0 | 1.0 | 150 | 42 |

EXAMPLES 7–10

The effect of the ratio of low molecular weight pore-former to high molecular weight pore-former was studied. Microporous hydrophilic hollow fiber membranes were prepared as in Example 1 except that various ratios of EG to PEG were used in the spinning solution. Samples of the so-cast fibers, together with samples of the fibers from Example 1 were examined by SEM. A summary of the observations from these examinations is presented in Table 3. Based upon the results, it was concluded that when the EG/PEG ratio is too low, the wall structure is nonporous and the outside surface has a low porosity. Conversely, if the EG/PEG ratio is too high, the wall structure has undesirably large voids and the outside surface has no porosity. Accordingly, it was concluded that a preferred range for the low molecular weight to high molecular weight pore-former ratio is from about 0.3 to about 3.0 to obtain a uniformly porous wall structure with a highly porous outside surface.

TABLE 3

| Example No. | EG/PEG Ratio | Wall Structure | Outside Surface Structure |
|---|---|---|---|
| 7 | No EG | Nonporous | Low porosity |
| 8 | 0.5 | Uniformly porous | Moderate porosity |
| 1 | 1 | Uniformly porous | High porosity |
| 9 | 3 | Uniformly porous | Moderate porosity |
| 10 | no PEG | Large void | No porosity |

EXAMPLES 11–28

The effect of varying the crosslinking conditions on the wet tensile strength and wet elongation at break was studied. Microporous hydrophilic hollow fiber membranes were prepared as in Example 2, except that the conditions used for crosslinking the fibers were varied according to the values reported in Table 4, with the results shown in Table 4.

TABLE 4

| Example No. | GA Conc. (Wt %) | Soak Time (min) | Oven Temp. Rate (OC/min) | Oven Temp. (OC) | Time in Oven (hr) | Wet Tensile Strength (g/fil) | Wet Elongation at Break (%) |
|---|---|---|---|---|---|---|---|
| 11 | 1 | 10 | 1 | 80 | 180 | 290 | 33 |
| 12 | 1 | 30 | 1 | 80 | 180 | 290 | 35 |
| 13 | 1 | 120 | 1 | 80 | 180 | 340 | 30 |
| 14 | 1 | 240 | 1 | 80 | 180 | 420 | 25 |
| 15 | 1 | 5 | 5 | 50 | 5 | 200 | 85 |
| 16 | 1 | 10 | 5 | 50 | 5 | 220 | 66 |
| 17 | 1 | 30 | 5 | 50 | 5 | 230 | 72 |
| 18 | 2.5 | 5 | 5 | 50 | 5 | 280 | 52 |
| 19 | 2.5 | 10 | 5 | 50 | 5 | 280 | 43 |
| 20 | 2.5 | 30 | 5 | 50 | 5 | 310 | 42 |
| 21 | 4 | 5 | 5 | 50 | 5 | 330 | 39 |
| 22 | 4 | 10 | 5 | 50 | 5 | 310 | 31 |
| 23 | 4 | 30 | 5 | 50 | 5 | 320 | 36 |
| 24 | 5 | 1 | 1 | 80 | 180 | 380 | 23 |
| 25 | 5 | 5 | 1 | 80 | 180 | 430 | 24 |
| 26 | 5 | 10 | 1 | 80 | 180 | 420 | 24 |
| 27 | 5 | 30 | 1 | 80 | 180 | 410 | 24 |
| 28 | 5 | 120 | 1 | 80 | 180 | 400 | 23 |

EXAMPLES 29–32

The effect of varying the temperature of the quench bath on flux was studied. Microporous hydrophilic hollow fiber membranes were prepared as in Example 1 except that the polymer solution comprised 32.5 wt % EVAL. 7.5 wt % PEG, 7.5 wt % EG, and 0.1 wt % water in DMSO, and the temperature of the quench bath was varied as indicated in Table 5, with the results shown in Table 5.

TABLE 5

| Example No. | Quench Bath Temperature (° C.) | Water Flux (m³/m²·d·0.1 MPa) |
|---|---|---|
| 29 | 45 | 6.2 |
| 30 | 50 | 7.9 |
| 31 | 53 | 7.4 |
| 32 | 55 | 7.0 |

EXAMPLES 33–36

The effects of varying the temperature of the spinning solution was studied. Microporous hydrophilic hollow fiber membranes were prepared as in Examples 29–32 and the temperature of the spinning solution was varied as indicated in Table 6, with the results shown in Table 7.

TABLE 6

| Example No. | Spinning Solution Temperature (° C.) | Water Flux (m³/m²·d·0.1 MPa) |
|---|---|---|
| 33 | 57 | 5.5 |
| 34 | 58 | 6.5 |
| 35 | 63 | 9.4 |
| 36 | 66 | 9.7 |

EXAMPLES 37–38

The following examples show the effect by conducting hot water treatment on the fiber membrane after rinsing or drying and before crosslinking.

A dry hollow fiber membrane obtained in Example 1 was preserved at room temperature for about one month. Thus preserved hollow fiber membrane was subjected to a hot water treatment in a hot water bath. Prior to the hot water treatment, the fiber was soaked in water at ambient temperature (around 20° C.) to be swollen until the length of the fiber is no longer changed. The fiber membrane was then soaked in a hot water bath maintained at 80° C for over one minute. During the hot water treatment, the fiber membrane placed in the hot water bath was maintained to be sagged with no tension being applied thereto as if the fiber membrane was swimming in hot water. The thus treated fiber membrane was picked up from the bath and transferred into a water at ambient temperature (around 20° C.) to cool the fiber membrane.

Water flux, wet tensile strength and wet elongation at break of the fiber membrane before and after the hot water treatment (HWT) as mentioned above were determined in a similar manner as in Example 1. The results are shown in Table 7 below as Example 37.

A hollow fiber-membrane was formed and rinsed in a similar manner as in the steps (1)–(3) of Example 1. The thus obtained hollow fiber membrane just after rinsing step was subjected to a hot water treatment in a similar manner as mentioned above. Water flux, wet tensile strength and wet elongation at break of the fiber membrane before and after the hot water treatment were determined in a similar manner as in Example 1. The results are shown in Table 7 as Example 38.

TABLE 7

| Ex No | Clean Water Flux ($m^3/m^2 \cdot d \cdot 0.1$ MPa) | | Wet Tensile Strength (g/fil) | | Wet Elongation at Break (%) | |
|---|---|---|---|---|---|---|
| | before HWT | after HWT | before HWT | after HWT | before HWT | after HWT |
| 37 | 8.7 | 21.2 | 205 | 190 | 30 | 70 |
| 38 | 14.6 | 24.3 | 195 | 184 | 35 | 70 |

The results in Table 7 show that the hot water treatment according to the present invention improves waterflux and wet elongation at break of the fiber membrane substantially without affecting tensile strength thereof, and this effect may be obtained either when the hot water treatment is conducted just after rinsing the fiber membrane or after drying and preserving it for a long period of time.

EXAMPLES 39–41

These examples show the effect of varying the hot water treatment time. Hydrophilic microporous hollow fiber membrane was prepared as in Example 38 except that the period of time for the fiber membrane to be soaked in the hot water bath (hot water treatment time) was varied. The results are shown in Table 8.

TABLE 8

| Ex No | HWT time (seconds) | Clean Water Flux ($m^3/m^2 \cdot d \cdot 0.1$ MPa) | Wet Elongation at Break (%) |
|---|---|---|---|
| 39 | 0 | 13.1 | 32 |
| 40 | 5 | 22.0 | 86 |
| 41 | 60 | 21.9 | 78 |

The results in Table 8 show that the hot water treatment according to the present invention improves water flux and elongation at break even when the hot water treatment time is as short as 5 seconds.

EXAMPLES 42–45

Reproducibility of the effect by the hot water treatment was examined. A hollow fiber membrane was formed and rinsed in a similar manner as in the steps (1)–(3) of Example 1. The thus obtained hollow fiber membrane just after rinsing step was subjected to a continuous hot water treatment as explained below. The fiber, membrane was passed through the hot water bath maintained at 80° C. for around 5 seconds. The hot water bath used in these examples was equipped with two motorized pulleys, one being used as a fiber membrane inlet pulley by which the fiber membrane is introduced into the bath, and the other being used as a fiber membrane outlet pulley by which the fiber membrane is pulled out from the bath. Using these two motorized pulleys, the fiber membrane placed in the hot water bath was maintained to be sagged with no tension being applied between the two pulleys as if the fiber membrane was swimming in hot water. The thus treated fiber membrane was taken up onto a drum placed in warm water at 50° C., and maintained therein over one night, and then dried at ambient temperature in a dry air stream.

The membrane performance after the hot water treatment of the thus obtained hydrophilic microporous hollow fiber membrane are shown in Table 9.

TABLE 9

| Ex No | Clean Water Flux ($m^3/m^2 \cdot d \cdot 0.1$ MPa) | Wet Tensile Strength (g/fil) | Wet Elongation at Break (%) |
|---|---|---|---|
| 42 | 18.7 | 190 | 109 |
| 43 | 20.6 | 171 | 79 |
| 44 | 21.2 | 181 | 103 |
| 45 | 20.4 | 207 | 89 |

The results in Table 9 show that substantially equivalent effect are obtained in Examples 42–45, which reveals reproducibility of the effect by the hot water treatment according to the present invention.

EXAMPLES 46–47

The effect of the hot water treatment on blocking ability of the hollow fiber membrane was examined. According to the procedure of Example 38, two hydrophilic microporous hollow fiber membranes were prepared and subjected to the hot water treatment. Water flux and rejection of 0.1 µm particles of the membranes before and after HWT were determined. The results are shown in Table 10.

TABLE 10

| Ex No | Clean Water Flux ($m^3/m^2 \cdot d \cdot 0.1$ MPa) | | Rejection of 0.1 mm particles (%) | |
|---|---|---|---|---|
| | before HWT | after HWT | before HWT | after HWT |
| 46 | 6.8 | 15.0 | 99 | >99 |
| 47 | 7.8 | 16.4 | 99 | 99 |

The above results show that the hot water treatment according to the present invention will not affect blocking ability of the hollow fiber membrane.

EXAMPLES 48–50

These examples show the effect of "relaxation" of fiber membrane during the hot water treatment. According to the procedure of Example 38, a hydrophilic microporous hollow fiber membrane was prepared. The fiber membrane was divided into three specimens and each of them was subjected to the hot water treatment. In Example 48, the hot water treatment was carried out at 80° C. for 1 minute while no tension was applied to the fiber membrane placed in the hot water bath. In Examples 49 and 50, the hot water treatment was carried out at 80° C. for 1.5 minutes (Example 49) or 4 minutes (Example 50) while the fiber membrane placed in the hot water bath was strained by means of some pulleys placed in the hot water bath. Water flux and tensile properties before and after HWT were determined. The results are shown in Table 11.

TABLE 11

| Ex No | Clean Water Flux ($m^3/m^2 \cdot d \cdot 0.1$ MPa) | | Wet Tensile Strength (g/fil) | | Wet Elongation at Break (%) | |
|---|---|---|---|---|---|---|
| | before HWT | after HWT | before HWT | after HWT | before HWT | after HWT |
| 48 | 10.9 | 26.8 | 212 | 200 | 31 | 76 |
| 49 | 10.9 | 11.6 | 212 | 201 | 31 | 49 |
| 50 | 10.9 | 13.2 | 212 | 198 | 31 | 48 |

The results of Table 11 show that, if the hot water treatment is carried out while tension is applied to the fiber membrane, flux and elongation at break of the fiber membrane is not improved.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A process for the fabrication of a microporous hydrophilic hollow fiber membrane from an ethylene-vinyl alcohol copolymer comprising the steps:

(a) providing a spinning solution comprising 25 to 40 wt % ethylene-vinyl alcohol copolymer, 5 to 15 wt % low molecular weight pore-former, 5 to 15 wt % high molecular weight pore-former, 0.05 to 1 wt % water, and a solvent;

(b) forming a spun hollow fiber by extruding said spinning solution through an orifice at a temperature above the precipitation point of the solution while simultaneously injecting a coagulating fluid through a needle located in said orifice;

(c) drawing said spun hollow fiber into a quench bath of 15 to 35 wt % of an alcohol in water at a temperature of 40° to 65° C. to form a hydrophilic microporous hollow fiber membrane;

(d) stretching while rinsing said hydrophilic microporous hollow fiber membrane with water; and (e) drying said hydrophilic microporous hollow fiber membrane.

2. The process of claim 1 wherein the degree of stretching during step (d) is from about 1.3 to about 3.0.

3. The process of claim 1 including an additional step (f) comprising crosslinking said hollow fiber membrane.

4. The process of claim 3 wherein said crosslinking is conducted by a process comprising the steps:

(i) soaking said hollow fiber membrane in an aqueous solution of glutaraldehyde;

(ii) drying said hollow fiber membrane; and (iii) annealing said hollow fiber membrane.

5. The process of claim 1 wherein the ethylene content of said ethylene-vinyl alcohol copolymer of step (a) is from 27 to 48 mol %.

6. The process of claim 1 wherein said low molecular weight pore-former of step (a) is selected from monohydric and polyhydric alcohols.

7. The process of claim 1 wherein said high molecular weight pore-former of step (a) is selected from the group consisting of polyethylene glycol, polyethylene oxide, polypropylene glycol, polyethylene oxide, polypropylene glycol, polyvinyl pyrrolidone and polyvinyl alcohol.

8. The process of claim 1 wherein said solvent of step (a) is selected from the group consisting of dimethylsulfoxide, dimethylformamide, dimethylacetamide, and N-methylpyrrolidone.

9. The process of claim 1 wherein the weight ratio of said low molecular weight pore-former to said high molecular weight pore-former of step (a) is from about 0.3 to about 3.

10. The process of claim 1 wherein said spinning solution of step (a) comprises 30 wt % ethylene-vinyl alcohol copolymer, 8.5 wt % ethylene glycol, 8.5 wt % polyethylene glycol, 0.1 wt % water and the solvent is dimethylsulfoxide.

11. The process of claim 1 wherein said coagulating fluid of step (b) is selected from the group consisting of water, mixtures of water and alcohols, mixtures of water and solvent, and mixtures of water, alcohols and solvent.

12. The process of claim 1 wherein said alcohol in step (c) is selected from the group consisting of methanol, ethanol, n-propanol, isopropanol, butanol, ethylene glycol and propylene glycol.

13. The process of claim 12 wherein said quench bath of step (c) comprises 20 to 30 wt % isopropanol in water.

14. The hollow fiber membrane product of the process of claim 1.

15. The product of claim 14 wherein said hollow fiber membrane has a clean water flux greater than 2 $m^3/m^2 \cdot d \cdot 0.1$ MPa at 25° C., a wet tensile strength greater than about 180 g/fil, and a wet elongation at break greater than 40%.

16. The process of claim 1 further comprising, after the rinsing step (d) and before the drying step (e), the step:

(g) subjecting the rinsed hydrophilic microporous hollow fiber membrane to hot water treatment in a hot water bath at a temperature of 50° C. to 100° C. while relaxing tension on the fiber.

17. The process of claim 16 wherein, in the heat treating step (g) or (h), tension on the fiber is decreased to as close to zero as possible by using two pulleys and allowing the fiber to sag between these pulleys.

18. The process of claim 16 wherein, in the heat treating step (g) or (h), the hot water treatment temperature is not less than 80° C.

19. The hollow fiber membrane product of the process of claim 16.

20. A process for improving membrane performance of a microporous hydrophilic hollow fiber membrane comprising the step:

(h) subjecting the hydrophilic microporous hollow fiber membrane obtained by the process of claim 1 to hot water treatment in a hot water bath at a temperature of 50° C. to 100° C. while relaxing tension on the fiber.

21. A process for the fabrication of a microporous hydrophilic hollow fiber membrane comprising crosslinking a hollow fiber membrane obtained by the process of claim 20.

22. The process of claim 21 wherein said crosslinking is conducted by a process comprising the steps:

(i) soaking said hollow fiber membrane in an aqueous solution of glutaraldehyde;

(ii) drying said hollow fiber membrane; and (iii) annealing said hollow fiber membrane.

* * * * *